No. 817,885. PATENTED APR. 17, 1906
C. G. TAYLOR.
LATHE ATTACHMENT.
APPLICATION FILED FEB. 9, 1905.
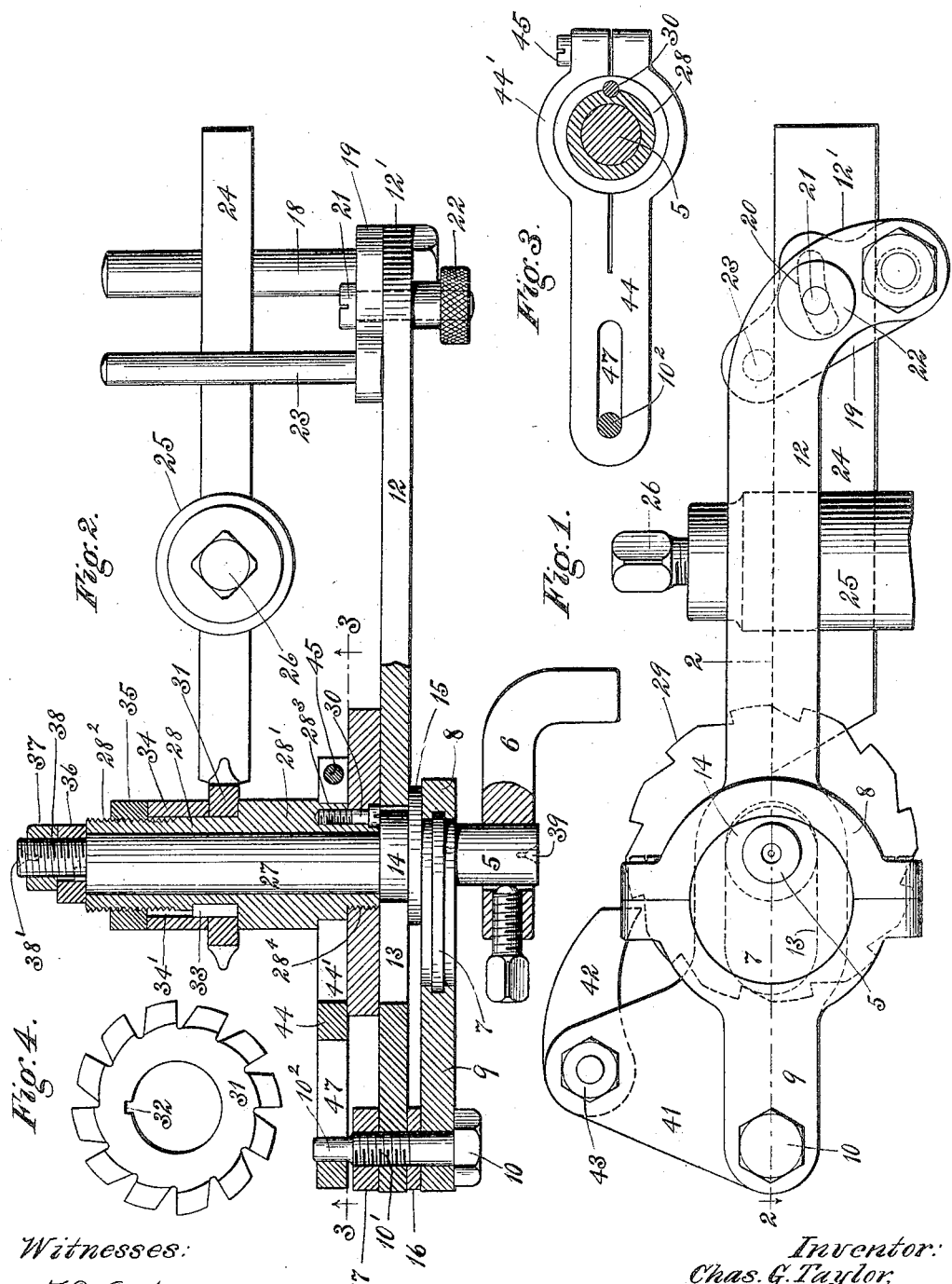
Witnesses:
F. E. Anderson.
Frances E. Blodgett.
Inventor:
Chas. G. Taylor,
By his Attorney,

UNITED STATES PATENT OFFICE.

CHARLES G. TAYLOR, OF HARTFORD, CONNECTICUT.

LATHE ATTACHMENT.

No. 817,885.  Specification of Letters Patent.  Patented April 17, 1906.

Application filed February 9, 1905. Serial No. 244,902.

*To all whom it may concern:*

Be it known that I, CHARLES G. TAYLOR, a citizen of the United States, residing at Hartford, in the county of Hartford and State of Connecticut, have invented certain new and useful Improvements in Lathe Attachments, of which the following is a specification.

This invention relates to attachments for lathes, and is designed for the purpose of relieving or backing off the teeth of milling, gear, and other cutters requiring a certain amount of relief to enable them to accomplish their work.

Primarily the object of the invention is the provision of a portable attachment comprising a shaft supported by the centers of a lathe and connected to rotate with the face-plate thereof, said shaft being eccentric to its journals for the greater portion of its length, and also carrying an eccentric for operating indexing mechanism.

A further object of the invention is the provision, in connection with the shaft above mentioned, of a bar carrying at one end an indexing-pawl and being adjustably connected at its opposite end to a plate, the plate and bar each carrying a rod adapted to fit over some fixed part of the lathe—for instance, the shank of a turning-tool—to thus prevent the bar from rotating with the shaft mounted between the lathe-centers.

A further object of the invention is the provision of a sleeve fitting over the eccentric portion of the shaft and to which sleeve the cutter-blank to be relieved is secured, said sleeve having rigid therewith a toothed index-plate turned at the proper times by the pawl when the bar is actuated by the eccentric above mentioned.

Other objects of the invention will be set forth in the following description.

In the accompanying drawings, Figure 1 is a side elevation of my improvement as it would appear in position between the centers of a lathe. Fig. 2 is a sectional view taken on line 2 2 of Fig. 1. Fig. 3 is a sectional view on line 3 3 of Fig. 2; and Fig. 4 is a side view of a milling-cutter, showing the relieved teeth.

Referring to the drawings, the numeral 5 designates a shaft having in its ends countersinks to receive the live and dead centers of a lathe. That end of said shaft fitted on the live-center is of greater diameter than the end received on the dead-center to afford sufficient strength to enable the usual dog or other connection 6 to the face-plate to rotate said shaft.

Rigid with the shaft 5 is an eccentric 7, shown having a three-quarter-of-an-inch throw, although this is immaterial and is governed entirely by circumstances in the use of the attachment. This eccentric is inclosed by the usual strap 8, constituting part of a bar 9, perforated at its end opposite the eccentric to receive a bolt 10, upon the smooth shank of which adjacent to the head it is mounted.

Designated by 12 is a long bar constituting part of the frame of the attachment, said bar being slotted at 13 to fit over an enlarged part 14 of the shaft 5 and bearing at one side against a collar 15 of the said shaft which separates it from the strap part of the bar 9, as illustrated in Fig. 2, the bars being spaced apart at their right-hand ends by a washer 16 on the bolt. This bolt is threaded at 10', and the thread engages a nut 17 in the end of the bar. At its inner end the bar 12 is downwardly curved at 12' and is perforated to receive the reduced end of a comparatively long rod 18, said rod passing through a plate 19, slotted at 20 to receive a bolt 21, having a thumb-nut 22, by which it is secured in place, said bolt enabling the plate to be adjusted on the bar. Projecting from the plate is a rod 23, as shown in Fig. 2, the two rods receiving between them the shank of a turning-tool 24, held in the usual tool-post 25 by a screw 26. Other guides for the rods may be employed, if desired, without departure from the invention. For a greater portion of its length between the ends the shaft 5 is provided with a long eccentric portion 27, having in the present instance about three thirty-seconds of an inch throw, although the proportions of said eccentric portion may be varied within wide limits, if desired. Surrounding said eccentric portion is a sleeve 28, enlarged at 28', having a reduced and threaded portion $28^2$ at one side beyond the enlargement 28', a reduced collar $28^3$, and a reduced and threaded part $28^4$ at the other side of said enlargement.

Designated by 29 is a toothed index-disk internally threaded at its hub to fit upon the threaded part $28^4$ and detachably secured rigidly to the sleeve by a screw or other device 30. Interchangeable index-disks having different numbers of teeth will be provided, so that the attachment may be employed to relieve the teeth of cutter-blanks having teeth varying in number from that shown in Fig. 4. Slipped upon the reduced part 28² of the sleeve 28 is the toothed blank 31, the slot 32 in the hub of said blank fitting over a spline or key 33, by which it is secured against independent rotation. A bushing 34, provided with a keyway 34' to engage the spline 33, is fitted over the reduced portion 28², and a nut 35 in engagement with the threaded part of said extension clamps the cutter-blank against the shoulder of the enlargement 28', as shown in Fig. 2. An eccentric-bushing 36 fits over the right-hand end of shaft 5, and a nut 37, engaging a threaded part 38 of said shaft, bears against the end of the sleeve 28 and serves to hold it in place without liability of binding on the shaft. At its threaded end 38 the end of the shaft is countersunk at 38' to receive the dead-center of a lathe, and it is similarly countersunk at 39 in its opposite end to receive the live-center. A lathe-dog 6 serves to connect the shaft with the face-plate, (not shown,) so that it will rotate therewith. Rigid with one end of bar 12 is an extension or standard 41, to the upper end of which a pawl 42 is pivotally connected by a bolt 43.

A bar 44, having a split yoke 44', is frictionally clamped upon the collar 28³ of the sleeve by a screw 45, as illustrated in Fig. 3, and said bar is slotted at 47 to fit over the reduced end or tip 10² of the bolt 10, carried by the reciprocating bar 12, said slot serving as a guide for the bolt and also, in virtue of the friction clamping-yoke 44', preventing the sleeve 28 from rotating except when turned by the indexing mechanism described.

In the operation of the invention a cutter-blank is secured to the sleeve 28 in the manner described. The attachment is placed between the lathe-centers with the ends of shaft 5 supported thereon, and the dog 6 is connected to the face-plate. Proper adjustment of the tool 24 is then made, and the live-spindle of the lathe being set in motion the shaft 5 will be rotated within the sleeve 28, and the eccentric 7 thereof, the strap of which is connected to the bar 12, will cause said bar to reciprocate, the rods 18 and 23, fitting over the tool-shank, guiding it and preventing it from rotation. During the rotation of the shaft 5 the eccentric portion 27 thereof causes the sleeve 28 to advance toward and recede from the tool 24, and during the corresponding movement of the cutter-blank carried by said sleeve the pawl 42 engages a tooth of the ratchet-disk 29 and turns the sleeve upon the part 27 to carry a tooth of the cutter downward with a gradually-advancing movement against the cutting edge of the tool, thereby imparting the desired relief thereto. While the shaft 5 is shown equipped with a lathe-dog for connecting it to a face-plate, it is distinctly to be understood that the invention is not limited thereto, for said dog may be dispensed with and the end of the shaft inserted in a chuck of the live-spindle, or it may be connected in other ways thereto, if desired.

As will be understood from the above description, the attachment is of simple construction, being composed of few parts, and is reliable and accurate in operation. By its use each tooth of a cutter-blank may be given the same exact amount of relief, and as the attachment is adapted for use with any lathe it may readily be placed in position for coöperation with the turning-tool thereof.

Heretofore special machines have been employed for relieving the teeth of tools, and said machines have been of complicated construction, involving large expense in their manufacture, all of which is obviated by the simple machine shown and described, which, while accurate in operation, may be manufactured at minimum expense compared with existing structures.

Changes may be made in various details of the attachment, and eccentrics with amounts of throw different from those described may be employed without departure from the invention.

Furthermore, the invention is not limited to use with a turning-lathe, for it may be employed with milling and other metal-working machines, if desired.

Having thus described my invention, what I claim is—

1. A relieving attachment comprising a shaft having an eccentric portion and a sleeve surrounding said eccentric portion; means for clamping a toothed cutter-blank to the sleeve; means for rotating the shaft, and thereby causing the sleeve to advance toward and recede from a turning-tool; an index-plate secured to the sleeve; a pawl; a reciprocatory bar carrying the pawl; projections, between which a guide is secured, carried by said bar; and an eccentric on the shaft for actuating the bar.

2. The combination, with a shaft having an eccentric portion between its ends, said shaft also carrying an ecentric, of a sleeve mounted upon the shaft; means for clamping the cutter-blank to the sleeve; a bar having a slot fitting over a collar of the shaft; projections on the bar adapted to fit over and be guided by a fixed part of the lathe; means for connecting the eccentric with the reciprocatory bar; and a pawl carried by said reciprocatory bar, and adapted to engage the teeth of the index-plate.

3. In an attachment for lathes, the combination, with a shaft having an eccentric portion, of a sleeve surrounding said eccentric portion; means for securing a cutter-blank to the sleeve; an index-plate rigid with the sleeve; a bar slotted to receive the shaft; a pawl carried by the bar; means actuated by the shaft for reciprocating the bar; and means for guiding and preventing displacement of the bar during its reciprocatory movement.

4. An attachment for lathes, comprising a shaft having an eccentric portion between its ends; a sleeve surrounding said shaft and mounted on the eccentric portion thereof; means for securing a cutter-blank to the sleeve; a bar slotted to receive the shaft; a pawl pivoted to said bar; an index-plate rigid with the sleeve; a friction-yoke secured to the sleeve, and having a slotted extension; an eccentric rigid with the shaft; a strap for said eccentric, and having an extension; and a bolt connecting said extension with the bar, and having an end entering the slot in the yoke extension.

5. The combination, with a shaft, of means for securing a cutter-blank to said shaft; a reciprocatory bar; means actuated by the bar for indexing the shaft; an eccentric carried by the shaft and engaging the bar; a plate adjustable on said bar; a projection on said plate; and a projection on the bar, said projections being adapted to engage a guide, and prevent the bar from rotating on the eccentric.

6. The combination, with a shaft, adapted to be received by the centers of a lathe, and having an eccentric portion, of a sleeve mounted on said eccentric portion; a friction-yoke secured on the sleeve, said yoke having a guide-arm; means for engaging said guide-arm, and thus normally holding the sleeve against rotation; and means for indexing the sleeve.

In testimony whereof I affix my signature in presence of two witnesses.

CHARLES G. TAYLOR.

Witnesses:
F. E. ANDERSON,
FRANCES E. BLODGETT.